…

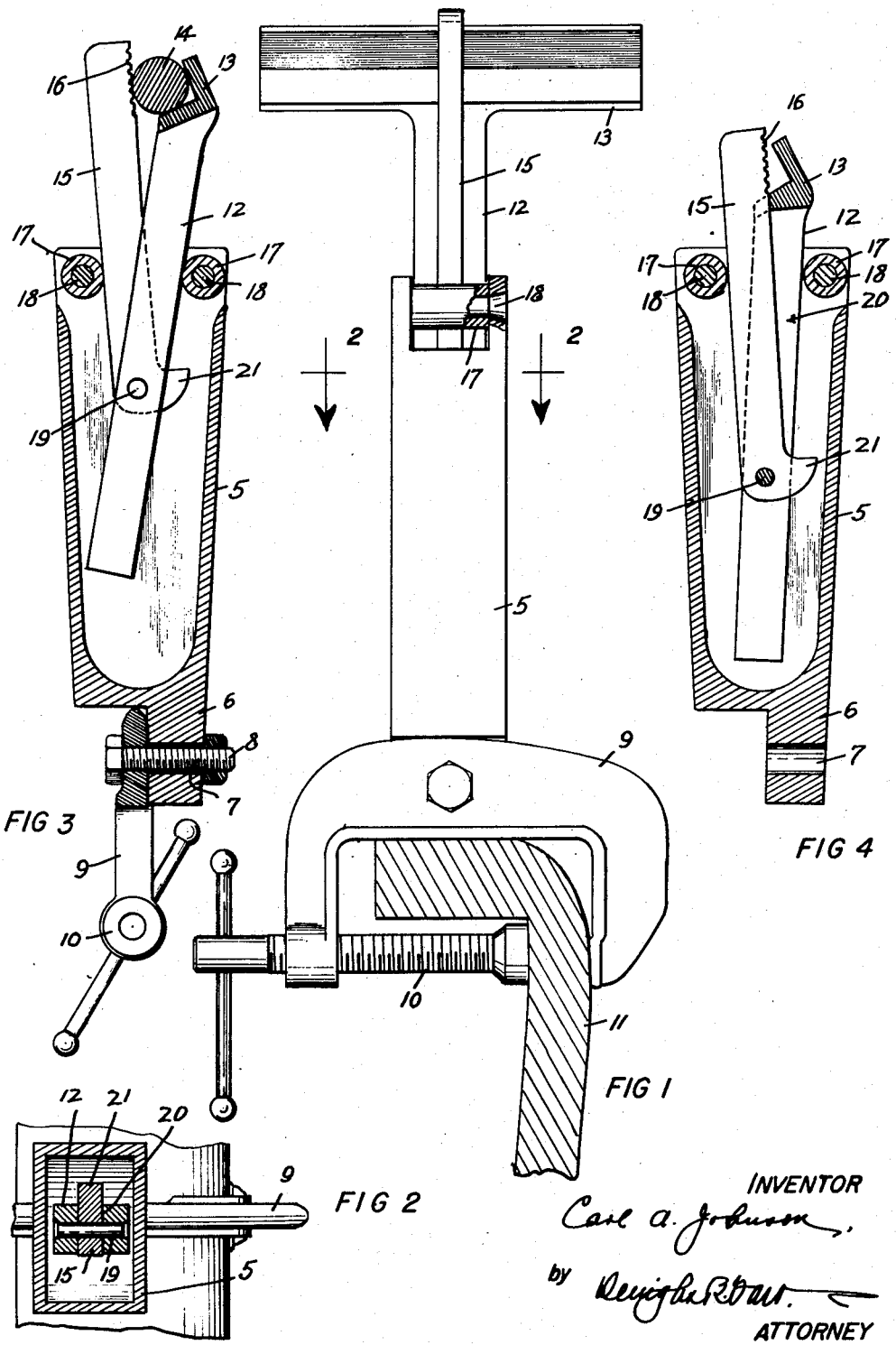

United States Patent Office 2,939,662
Patented June 7, 1960

2,939,662

FISHING ROD HOLDER

Carl A. Johnson, P.O. Box 141, Thrall, Tex.

Filed June 12, 1958, Ser. No. 741,553

2 Claims. (Cl. 248—41)

This invention pertains generally to rod holders and is particular adapted to support a fishing rod and to maintain the same in proper position so as to render it unnecessary that the fisherman at all times support the rod.

The primary object of the invention is to provide a holder of the character and for the purpose generally stated which involves means whereby the rod may be easily and quickly attached to the holder and which may with equal facility and ease be quickly removed from the holder for the purpose of playing or landing the fish.

A still further object is to provide a holder of comparatively simple construction and easy operation which may be readily attached to or removed from a fixed support, such as a boat portion, or may be so designed as to be attached to a suitable support located upon the ground.

A still further object is to provide gripping means in connection with a holder of the character mentioned which when in use maintains a firm grip upon the rod, maintaining the same against slipping even should a large fish stoutly pull upon the line, but which is of such sensitive nature as to immediately release the rod when upward movement is applied thereto by the fisherman.

With the foregoing objects in view, together with others which will appear as the description proceeds, the invention resides in the novel construction, combination and arrangement of parts, all as will be described more fully hereinafter, illustrated in the drawing, and particularly pointed out in the claims.

In the drawings:

Fig. 1 is a side elevation, parts in section, of a holder constructed in accordance with my invention and showing the same as applied to a suitable support, such for instance as the side or gunwale of a boat, Fig. 2 is a transverse sectional view taken substantially upon line 2—2 of Fig. 1, Fig. 3 is a vertical longitudinal sectional view taken through the holder and showing the parts in the position they will assume when gripping a fishing rod, and Fig. 4 is a view similar to Fig. 3 and showing the parts in the position they will assume when the rod is removed.

It is the general purpose of the invention to provide a fishing rod holder of the character and for the purposes generally stated which may be readily applied either to the side or other portion of a boat, or may be secured to a post driven into the ground or sand; the invention residing particularly in the specific construction and arrangement of the parts constituting the rod holder.

In the present instance, the holder comprises a socket indicated generally at 5 which is closed at its lower end as shown and is open at its upper end. This socket may be formed of any desirable material, such as metal or aluminum, and is provided at its lower end with a depending lug 6 having a lateral opening 7 therein through which a bolt 8 may be passed to secure the socket to a clamp 9 of well known construction. The C clamp here illustrated is provided with the usual threaded shaft 10 by means of which the clamp may be securely attached to the support, such as a boat side or gunwale 11 with the socket 5 in upstanding position. It will be understood, of course, that in instances where the holder is to be used in connection with a post or stake driven into the ground or sand, a suitable bolt such as indicated at 8 may be passed through the opening 7 to secure the socket thereto in upright position.

The clamping means includes a post 12 to be slidably arranged within the socket with its outer or upper end projecting beyond the open end of the socket. This post is provided at its upper end with a laterally disposed rest 13 of right angular shape in cross section as shown and of such size as to engage one side of a fishing rod indicated at 14.

Carried by the post 12 upon that portion thereof which is normally housed within the socket 5 is the lower end of a link 15 which is so positioned with respect to the post as to have its upper end engaged with the opposite side of the fishing rod 14. In order to firmly grip the fishing rod, the inner surface of the link 15 may be serrated as at 16 as shown.

The arrangement of the post 12 and the link 15 which it carries is such that when not engaged with a fish rod, the structure drops by gravity within the socket 5 and generally assumes the position shown in Fig. 4. On the other hand, when engaging the fishing rod, the post 12 and the link 15 are brought into tight engagement at their outer ends with the rod, the weight of the latter tending to maintain this clamping engagement. To accomplish this, abutment members, such as rollers 17 are arranged in spaced parallelism and supported by suitable shafts or pins disposed one upon each side of the post and engaged with the outer surfaces of the post 12 as well as the clamp 15. In the present instance, the link 15 is pivoted as at 19 inwardly from the lower end of the post 15 but at a point that is wholly within the socket 5. The post 12 is provided with a longitudinal slot indicated at 20 in order to accommodate the lower end of the link 15, and this slot extends from the bottom portion of the post to its juncture with the laterally disposed angular grip member 13. The link is provided at its lower end with an outwardly projecting lug 21 which acts as a stop in engaging one of the rollers 17 to prevent the post and link being withdrawn from the socket member.

In operation, the socket is properly mounted and secured in substantially upright position, and in order to engage a fishing rod therein it is but necessary to lift the post 12, whereupon the link 15 automatically separates itself from the post affording ample space between the outer ends of the post and the link for the accommodation of the rod 14. The weight of the rod, in addition to the weight of the combined post and link, will cause the post and link to move downwardly, until the outer vertical edges of the post and link engage the abutment members or rollers 17, which causes the link and post to move together in firm clamping engagement with the rod 14. When it is desired to remove the rod from the holder it is but necessary to lift the rod, whereupon the clamping elements are raised slightly so as to release their grip upon the rod, after which they drop back and assume the normal position illustrated in Fig. 4.

From this construction it is apparent that I have provided a simple yet most efficient fishing rod holder which may be manufactured by easy processes at a minimum of cost and yet which will fully accomplish the sought objects. Of importance is the specific construction and arrangement of the combined post and link movable longitudinally within the socket which brings about a firm clamping action upon the rod and yet is extremely sensitive in release of the rod immediately lifting action is applied to the rod. It will be observed, particularly with reference to Fig. 1 of the drawings, that the rod rest 13 is somewhat elongated so as to present considerable rest surface for a side of the rod. The relatively narrow clamping edge of the link 15 is sufficient to bring about the desired clamping action to hold the rod securely in position within the rest.

In the claims:

1. In a fishing rod holder, an upstanding socket open at its upper end, a pair of spaced apart abutment members disposed in parallelism near the upper end of said socket and inwardly of the front and rear walls of said socket, a post and a link pivotally connected together at their lower ends disposed within said socket with their outer edges engaged with said abutment members, the combined width of the post and link being substantially less than the distance between the front and rear walls of said socket to permit free movement of said unit within the socket, a lug projecting outwardly from the pivoted end of said link sufficiently far to engage one of said abutment members when the post and link are moved as a unit outwardly of said socket, and a rod rest affixed to the outer end of said post to hold a rod in clamping engagement between itself and the adjacent end of said link when said post and link are moved toward one another as the unit gravitates within the socket.

2. In a fishing rod holder, a socket open at its upper end, a pair of abutment members disposed in spaced parallelism one at each side of the open end of said socket and inwardly of the front and rear walls thereof, a straight post and a straight link pivoted together at their lower ends slidable vertically as a unit within said socket with said pivoted ends disposed below said abutment members, the combined width of the post and link being substantially less than the distance between the front and rear walls of said socket to permit free movement of the said unit within the socket, the outer edges of said post and link engaging said abutment members whereby said post and link will be forced together in clamping engagement as the post and link are lowered as a unit within said socket, a rod supporting rest disposed transversely of the upper end of said post to receive a fishing rod between itself and the straight surface of the clamping link, and a lug integral with said link at the pivoted end thereof and projecting beyond the outer surface of said post sufficiently far to engage with one of the abutment members when the post and link move outwardly of the socket in releasing the fishing rod.

References Cited in the file of this patent

UNITED STATES PATENTS

| | | |
|---|---|---|
| 1,358,651 | Proppe | Nov. 9, 1920 |
| 1,760,592 | Gift | May 27, 1930 |
| 2,589,520 | Wallenius | Mar. 18, 1952 |
| 2,739,347 | Sharp | Mar. 27, 1956 |